Sept. 12, 1967  H. BORMANN ETAL  3,341,599
PURIFICATION OF POLYETHERS
Filed July 1, 1964
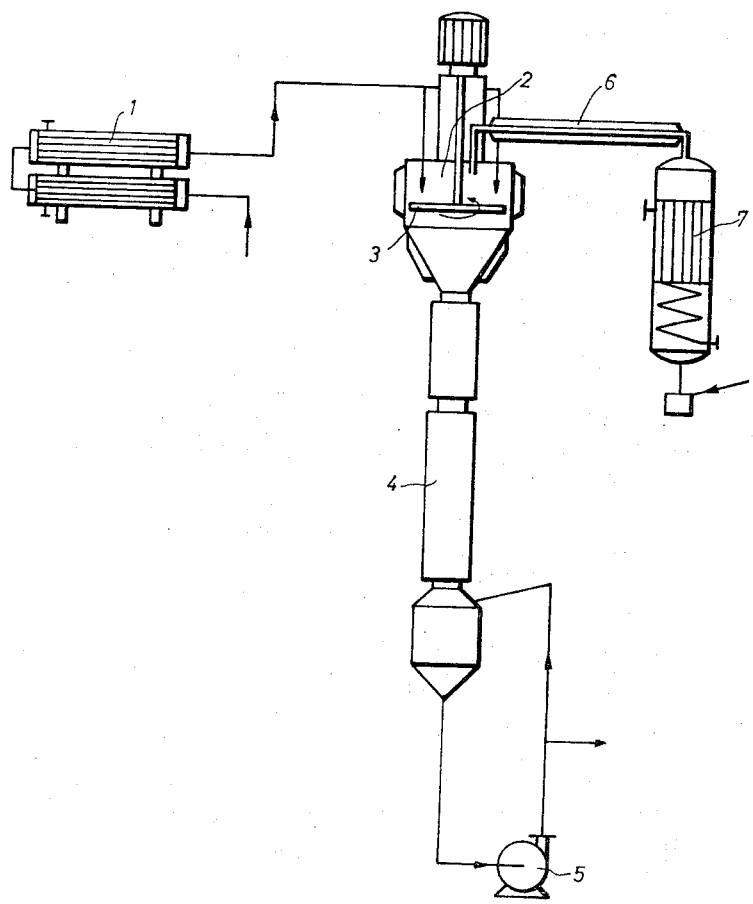
INVENTORS:
HEINRICH BORMANN, HERBERT NORDT
BY Clelle W. Upshaw
and Gene Harsh
ATTORNEY

United States Patent Office 3,341,599
Patented Sept. 12, 1967

3,341,599
PURIFICATION OF POLYETHERS
Heinrich Bormann and Herbert Nordt, Leverkusen, Germany, assignors to Farbenfabriken Bayer Aktiengesellschaft, Leverkusen, Germany, a corporation of Germany
Filed July 1, 1964, Ser. No. 379,539
Claims priority, application Germany, July 11, 1963, F 40,206
8 Claims. (Cl. 260—584)

This invention relates to polyhydric polyoxy alkylene ethers and more particularly to a method of purifying polyhydric polyoxy alkylene ethers so that they are suitable for the production of polyurethane plastics.

Polyhydric polyoxy alkylene ethers are produced commercially on a large scale by the addition of an alkylene oxide to various initiators. The reaction is usually carried out in the presence of an alkaline catalyst. The resulting polyethers have free hydroxyl groups but some carry terminal alcoholate groups because of the presence of the alkaline catalyst. Where the polyhydric polyalkylene ethers are to be used for reaction with an organic polyisocyanate to prepare a polyurethane plastic, they must be of a high purity, particularly with reference to water, acidity, color and residual catalyst. The catalyst, if it remains in the polyhydric polyalkylene ether, will effect the rate of reaction of the polyhydric polyoxy alkylene ether with the organic polyisocyanate and upset the crucial relationship between gel time and bubble formation.

In order to use the polyhydric polyalkylene ethers especially for the production of polyurethane plastics, it is necessary to purify them particularly with regard to the alkaline catalyst. Removal of the alkaline catalyst not only has an effect on the activity of the resulting polyether, but it also aids in re-establishing free hydroxyl groups in place of the alcoholate groups referred to above. It is known to neutralize the alkaline catalyst with aqueous mineral acids. This neutralization procedure forms an emulsion of the mineral acids and the polyhydric polyalkylene ether. Heretofore, the water of the emulsion has been distilled off at relatively high temperatures until the emulsion is dry. The salts which are precipitated by the removal of the water remain in the polyether and are removed mechanically, for example, by filtration.

The foregoing procedure suffers from many disadvantages in commercial practice. For one thing, the mechanical separation of the mineral acid salts especially when a low level of residual catalyst is to be obtained is very difficult since the progressive drying leaves salts which form slimy, fine suspensions. These suspensions even when subjected to centrifugation result in only partial extraction of the salts, and filters with pre-coated filter aids become plugged in a short time.

It has also been proposed heretofore to use certain pH values and restrict the mineral acid to hydrochloric acid in order to aid in the formation of large crystals of the salts precipitated. In using such a process, it is usually not possible to obtain a satisfactory low level of catalyst without the use of surface active agents such as activated charcoal, diatomaceous earth and the like. This is particularly true of emulsifiable branched polyethers which have products which are basic due to the use of amines and initiators. The choice of alkaline catalyst, neutralizing acids and solvents is thus considerably limited.

Moreover, and perhaps more important than the foregoing disadvantages of the prior art process, the resulting polyethers are still of unsatisfactory purity. Thus when most of the water has been removed from the emulsion, the remaining water can only be removed by prolonged heating at elevated temperatures, thereby exposing the polyether to high temperatures in the presence of precipitated salts. Degradation reactions take place at the high temperature under the relatively prolonged exposure to the finely divided salts present. These disadvantages for the production of pure polyethers are enhanced by the presence of surface active agents or clarifying agents which, as indicated above, are necessary in the heretofore known process for the complete separation of the salts. The catalytic attack on the polyhydric polyoxy alkylene ethers by the mineral salts makes it impossible by usual process to produce colorless, odorless, polyethers having a low ash content which are low in carbonyl and peroxide content. The heretofore known process requires lengthy after-treatment of the polyether in order to avoid these difficulties.

It is, therefore, an object of this invention to provide an improved process for the purification of polyhydric polyoxy alkylene ethers. A further object of this invention is to provide an improved method of removing catalyst used in the preparation of polyhydric polyoxy alkylene ethers. A still further object of this invention is to provide improvements in the process of preparing polyhydric polyoxy alkylene ethers. A further object of the invention is to provide an improved method of precipitating the catalyst used in the production of a polyhydric polyoxy alkylene ether based on the polymerization of an alkylene oxide. A still further object is to provide an improved method for the purification and preparation of low ash substantially colorless, odorless, relatively pure polyhydric polyoxy alkylene ethers.

The foregoing objects and others which will become apparent from the following description are accomplished in accordance with the invention, generally speaking, by providing for the step-wise removal of water and catalyst in the production of polyhydric polyoxy alkylene ethers. In this process, a mineral acid is added to the polyether containing catalyst in an amount sufficient to react with substantially all of the alkaline catalyst. Then water is removed until a residual water content of from about 0.5 to about 3% by weight of the total weight of the reaction mixture is formed. This results in the precipitation of large well-defined mineral acid salt crystals which are easily removed from the polyhydric polyoxy alkylene ether by mechanical means, for example, by filtration, leaving a relatively pure polyhydric polyalkylene ether containing up to about 3% by weight of water. The last of the water is finally removed preferably under a partial vacuum.

Therefore, the process of the present invention provides for the reaction of an alkylene oxide with an initiator in the presence of an alkaline catalyst to prepare a polyhydric polyoxy alkylene ether. The crude polyhydric polyalkylene ether contains various impurities including the alkaline catalyst, the water of condensation, color impurities and other residue. Next a mineral acid is added, preferably in aqueous solution, after the polymerization is complete. Mineral salts are formed and an emulsion of the polyether, water, mineral salts and other by-products results. The purification process of this invention is characterized in that the water of the emulsion is stripped off preferably under a partial vacuum while maintaining the temperature at about 40° C. to 80° C. The vacuum being between about 50 and about 120 mm. Hg, until a residual content of from about 0.5% to about 3% by weight based on the total weight of the reaction mixture is obtained. The salts precipitate as large crystals. The precipitated salts are then removed mechanically and finally the residual water is removed preferably at a temperature of from about 80° C. to about 150° C. under a vacuum until a residual water content preferably of from about 0.8 to about 1.8% is obtained.

The invention contemplates polyhydric polyalkylene ethers based on any suitable alkylene oxide. It is preferred to use alkylene oxides which contain 3 or 4 carbon atoms in the alkylene chain, but the preferred alkylene oxides may be mixed with any suitable amount of ethylene oxide. Preferably, however, less than 50% of the ethylene oxide is used. The preferred alkylene oxides, 1,2-propylene oxide, 1,2-butylene oxide, 1,3-propylene oxide, 1,3-butylene oxide, tetrahydrofuran and the like, are reacted together with any suitable initiator including water or an active hydrogen containing compound containing active hydrogen containing groups as determined by the Zerewitinoff method.

Any suitable compound containing active hydrogen containing groups as determined by the Zerewitinoff method may be used as the initiator including, for example, polyhydric alcohols, amines, phenols, or the like. Any suitable polyhydric alcohol may be used such as, for example, ethylene glycol, 1,2-propylene glycol, 1,4-butane diol, 1,6-hexane diol, trimethylolpropane, glycerine, 1,2,6-hexane triol, pentaerythritol, pentitol, sorbitol, mannitol, sucrose or the like. Any suitable amino alcohol may be used such as, for example, diethanol amine, dipropanol amine, triethanol amine or the like. Any suitable phenol may be used such as, for example, 2,2-bis-p-hydroxy phenyl propane. Any suitable amine may be used such as, for example, ethylene diamine, propylene diamine, aniline, 4,4'-diphenyl methane diamine, hydrazine or the like.

Any suitable alkaline catalyst may be used, but it is preferred to use a sodium hydroxide or potassium hydroxide. Mineral acids which are suitable for reaction with the alkaline catalyst to prepare the salt are, for example, sulfuric acid, phosphoric acid, hydrochloric acid, sulfurous acid and the like.

In the process of the present invention, products substantially free from ash are obtained when the residual water contents are still as high as 1.5 to 2.5% by weight of the reaction mixture. This is surprising since one would assume that while there is a residual water content, some of the mineral acid would stay in solution. However, the mineral acid salt precipitates completely so that it can be mechanically removed from the polyether over a wide range of pH values. The separation of the salt may be carried out in one or several steps by centrifugation or by simple filtration. When following the prior art process this was not possible and the disadvantages of the prior art process are avoided by following the method of purification of the present invention. Furthermore, the method of purification does not depend on the use of hydrochloric acid as was essential, for example, in the process of U.S. Patent 3,016,404. On the contrary, the process of the present invention is independent of the type of acid used for neutralization and the type of alkaline catalyst used in the polymerization reaction.

The procedure of the present invention is useful on a commercial scale and permits convenient working up of the polyhydric polyether polymers while avoiding the usual degradation reactions of the polymers with the complete removal of the catalyst and water. This is done with only a brief heating of the polyethers, thus avoiding the risk of decomposition. The volatile secondary constituents, including the odoriferous substances containing carbonyl groups, dioxanes or solvents, can be more easily removed from the polymers to produce pure and odorless products. Furthermore, subsequent clarification of the completely dried products with surface active or branching agents is superfluous, so that the dried products which are particularly sensitive to oxidation are not harmed.

A further advantage of the method of the invention is that it is now possible to add stabilizers to the polyether at an early stage. The stabilizer, particularly those which stabilize against oxidation or peroxide formation, can be added during the purification of the polyether, so that the polyether is stabilized during the critical stage of the removal of residual water. In the heretofore known processes, the stabilizer could not be added during the purification since the polyether was subsequently subjected to such high temperatures that it degraded with the formation of highly colored by-products or was adsorbed by the salts and auxiliary agents present. In the present process, however, stabilizers can be introduced into the aqueous emulsion obtained after the mineral acid is added to the reaction mixture. The stabilizers are fully effective from that time forward and are dissolved in the polyether and avoid any discoloration or loss due to adsorption.

Suitable stabilizers known in the art are four examples: 2,6-ditertiary butyl-p-cresol, hydroquinone, phenthiazine and 4-hydroxy-3-isobutyl-diphenylmethane.

The preparation of the polyethers in accordance with the invention up to the stage where the salt is precipitated is carried out by reaction of the above-named components in accordance with the well-known processes for the preparation of polyethers. After completion of the polyether formation, sufficient aqueous mineral acid is added to form a salt with substantially all of the alkaline catalyst. According to the invention, the water of the resulting emulsion is first removed to a residual content of from about 0.5 to about 3% by weight based on the total weight of the emulsion. This initial removal of water is preferably carried out at a temperature of from about 40° C. to about 80° C. under a partial vacuum of from about 50 to about 120 mm. Hg. Operation under these conditions permits the preparation of a highly satisfactory polyether containing substantially no degradation products. The optimum remaining water content depends on the molecular weight of the polyether. Furthermore, care must be taken in removing the water so that there will not be a localized fall of the water content below the required level. Otherwise, the objectionable slimy, finely divided salt particles which are difficult to separate from the polyether will result. This is accomplished by adjusting the temperature and vacuum at such levels that such a localized fall in the water content cannot occur. The water is generally removed by the above distillation procedure, but in a few cases it can be removed by means of other separators. The initial removal of the water to the level required can be accomplished by any suitable means provided that the water content reaches the desired level without the formation of by-products or decomposition products.

The preliminary removal of water may also be carried out continuously in thin film evaporators. It is advantageous to insure, by suitable preliminary emulsion temperatures, that the necessary energy may be available and to dispense with heating of the apparatus or at least to reduce the heating to a minimum. For example, if the emulsion is continuously introduced into an evaporator at a temperature of from about 80 to about 100° C. and while the water content is from about 8 to about 50% by weight, and is removed at a vacuum of about 25 to about 40 mm. Hg as products having a temperature of from about 50 to about 70° C., a residual water content of about 0.8 to about 1.8% will be obtained.

The mineral salts are completely precipitated when the water has been removed by the above-recited procedure to a residual content of from about 0.5% to about 2.5% by weight. The salts are then separated mechanically, preferably by filtration. In the large scale production of polyethers, filtration may be carried out without hardly any pressure and through any suitable filter fabric of coarse mesh. Furthermore, it is advantageous to use as the sole filter layer, a loose cellulose which swells in the polyester. The cellulose may be added to the emulsion or directly to the polyethers which have undergone preliminary drying or it may be added alone as a pre-coating layer on the wide mesh fabric. Since the cellulose always traps excess residual acid, additional purification may thereby be achieved which may, if desired, be enhanced by addition of other substances such as synthetic magnesium oxide silicates.

After the initial separation of the salts, the residual water content is finally removed at an elevated temperature under partial vacuum. Generally speaking, it is preferred to use temperatures below about 100° C. under a partial vacuum of from about 15 to 30 mm. Hg. The final removal of water can be accomplished in a very short time, one can well afford to imploy an elevated temperature for the removal of residual water since, in the absence of mineral acids and clarifying agents, there is substantially no risk of any harmful side effects, or degradation of the polyether molecule and/or the stabilizers incorporated therein. Even relatively volatile by-products, for example, various odoriferous substances, are easily removed at the same time.

If the polyether has been prepared in the presence of solvents, the latter does not interfere with the process and the carrier may be removed along with the water without affecting the course of the reaction.

The resulting polyhydric polyoxy alkylene ethers are more stable, more pure, more odor-free and more colorless than heretofore known polyhydric polyoxy alkylene ethers. It is, therefore, possible to dispense with the use of branching agents which in turn could act as oxidizing agents on the polyether. The polyethers are useful where polyhydric polyoxy alkylene ethers have been used heretofore, but they are especially suitable for reaction with polyisocyanates which in turn may be used for the preparation of foams, as insulation for a wall of a dwelling or the like, or for the preparation of pillows, cushions, and also the polyether may be used for the preparation of polyurethane elastomers which are useful for gear wheels and the like.

The invention is further illustrated by the following examples in which parts are by weight unless otherwise specified.

EXAMPLE 1

About 225 kg. trimethylolpropane and about 7400 kg. propylene oxide are reacted with the addition of about 37 kg. sodium hydroxide and about 100 kg. toluene. About 7700 kg. of the colorless product at a temperature of about 100° C. are treated with about 710 kg. of about 5.8% sulphuric acid in an apparatus of about 15,000 liters capacity equipped with rapid stirrer. About 5 kg. 2,6-ditertiary butyl-p-cresol as stabilizer are added to the emulsion which is kept in an atmosphere of nitrogen.

The emulsion of the polyether having a molecular weight of about 4000 and the aqueous sodium sulphate solution, which contains stabilizer, is transferred to an apparatus with stirrer to which a condenser is attached. In this apparatus, about 550 kg. water are distilled off within about 3 hours in a vacuum of about 100 to 120 mm. Hg after the addition of about 3 kg. cellulose at about 60° C. When the water has been distilled off, the product is filtered in the course of approximately another 2 to 3 hours through a filter surface of about 15 square meters of a wide meshed fabric covered with about 3 kg. cellulose as pre-coating layer.

A homogeneously liquid, water-clear, neutral polyether having a water content of about 1.5% and free from dissolved inorganic constituents is obtained which can be dried in a thin layer evaporator at about 115° C. and under a vacuum of about 11 mm. Hg to form a colorless and odorless product which is free from solvent and has a residual water content of about 0.03%.

The filter cake on the mesh is blown dry with nitrogen and removed mechanically from the filter by rotation of the filter discs.

EXAMPLE 2

About 135 kg. trimethylolpropane, about 69 kg. propylene glycol and about 6350 kg. propylene oxide are reacted with about 47 kg. potassium hydroxide and about 100 kg. toluene. About 6700 kg. of the colorless, catalyst-containing product which is at a temperature of about 110° C. is reacted in an apparatus of about 15,000 liters capacity, in an atmosphere of nitrogen, with about 670 kg. of approximately 6.1% sulphuric acid after the addition of about 5 kg. 2,6-ditertiary butyl-p-cresol.

As shown in FIGURE 1, the emulsion obtained from the neutral polyether having an average molecular weight of about 2500 and the aqueous potassium sulphate solution is passed through a pre-heater 1 at about 90° C. through double inlet tubes constricted to about 5 to about 7 mm. to the top 2 of an evaporator apparatus which is kept at a vacuum maintained constant at about 35 mm. Hg.

The emulsion is extruded at a rate of throughflow of about 1.2 cubic meters per hour through the regulated pre-heater on the rotating distributor plate 3 of the evaporator head which is about 1000 mm. in width and after passing through the evaporator tube 4, which is about 3 meters long and about 250 mm. wide it is discharged at the same rhythm in a regulated flow from the bottom 5 of the evaporator.

Heating only the connecting tube 6 which is about 200 mm. wide and which carries the vapors in countercurrent to the condenser 7 and the evaporator head with reduced steam, a product is obtained which is at a temperature of about 60° C. and has a constant water content of about 1.4% and in which the precipitated potassium sulphate having a uniformly granular salt structure can be removed continuously by filtration through a pre-coat layer of about 6 kg. cellulose on about 15 square meters of a wide meshed filter surface.

In the process, a homogeneous liquid, water-clear and neutral polymer is obtained which is free from dissolved inorganic constituents and can be conveyed in a further continuous flow to a thin layer evaporator in which it is dried at about 100° C. at a constant rate of throughput to form a solvent-free and odorless end product having a residual water content of about 0.03%.

EXAMPLE 3

About 104 kg. ethylene diamine and about 6740 kg. propylene oxide are reacted with about 59 kg. potassium hydroxide and about 500 kg. toluene. About 7400 kg. of the product, which is at about 100° C. are treated with about 1000 kg. about 5.2% sulphuric acid in an apparatus of about 15,000 liters capacity.

About 840 kg. water are distilled from the resulting aqueous emulsion at about 65° C. in a vacuum of about 120 mm. Hg as in Example 1.

The product which contains salt and has a residual water content of about 1.5% is filtered at about 60° C. through about 3 kg. cellulose as pre-coat layer.

After filtration, the residual water is distilled off from the polyether down to about 0.04% in a thin layer evaporator at about 110° C. A colorless, odorless polyether free from solvent and free from constituents containing potassium is obtained.

EXAMPLE 4

About 225 kg. trimethylolpropane, about 7000 kg. propylene oxide and about 300 kg. ethylene oxide are reacted with about 47 kg. potassium hydroxide and about 150 kg. toluene. About 7700 kg. of the product, which is at a temperature of about 100° C. are emulsified in the presence of about 5 kg. 2,6-ditertiary butyl-p-cresol as stabilizer with about 720 kg. of about 10.1% phosphoric acid in an apparatus of about 15,000 liters capacity.

The emulsion composed of the polyether having a molecular weight of about 4000 and of the aqueous potassium phosphate solution formed, and which contains stabilizer is transferred to a distillation apparatus where about 570 kg. water are distilled off at about 65° C. in a vacuum of about 100 mm. Hg. The product, which contains phosphate is then filtered in the course of about two hours over a filter surface of about 15 square meters of a wide meshed fabric covered with about 4 kg. cellulose as pre-coat layer.

A completely colorless and neutral polyether is obtained which has a water content of about 1% and is free from dissolved inorganic constituents and which can be dried at rapid throughflow in a thin layer evaporator at about 110° C. and under a vacuum of about 11 mm. Hg to form a product which is free from solvent and odorless and has a residual water content of only about 0.2%.

EXAMPLE 5

A polyether is prepared from about 255 kg. 1,4-butane diol, about 3150 kg. propylene oxide and about 3150 kg. ethylene oxide with about 48.5 kg. potassium hydroxide. About 7200 kg. of the product are emulsified at about 100° C. with about 710 kg. of approximately 6% sulphuric acid as in Example 1. About 560 kg. water are distilled off from the emulsion at about 50 to about 70° C. under a vacuum of about 100 to 120 mm. Hg. The product, which contains potassium sulphate, is then filtered through about 5 kg. cellulose as pre-coat agent on a wide meshed metal fabric of about 15 square meters surface.

A colorless and neutral polyether is obtained which has a water content of about 1.1% and is free from dissolved inorganic constituents and can be dried in a thin layer evaporator at about 120° C. to form a colorless end product low in peroxide content.

EXAMPLE 6

A polyether is obtained at about 110° C. from about 2262 kg. trimethylolpropane and about 4830 kg. propylene oxide, using about 59 kg. potassium hydroxide and about 350 kg. toluene, and about 7500 kg. of this polyether are emulsified with about 47 kg. of approximately 6.8% sulphuric acid as in Example 1.

The emulsion formed from the polyether of molecular weight about 450 and the aqueous potassium sulphate solution formed is dried to a water content of about 1% in the presence of about 3 kg. cellulose at about 65° C. in a vacuum of about 100 mm. Hg.

The product, which still contains water, is filtered at about 60° C. over about 4 kg. cellulose as pre-coat layer on about 15 square meters of a wide meshed fabric.

A filtrate free from salt is obtained which is worked up in a thin layer evaporator at about 125° C. without decomposition to a colorless and odorless polyether having a residual water content of about 0.03%.

It is to be understood that the foregoing working examples are given for the purposes of illustration, therefore if the teachings of this disclosure are followed any other suitable alkylene oxide, alkaline catalyst, mineral acid or the like may be used.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of purifying a polyhydric polyoxyalkylene ether prepared by the reaction of a compound containing active hydrogen selected from the group consisting of polyhydric alcohols, amines, phenols, and water, with an alkylene oxide in the presence of an alkalimetal hydroxide, which comprises neutralizing the alkali metal hydroxide with an aqueous solution of a mineral acid to prepare an emulsion containing polyether and mineral acid salt, removing water from said emulsion until a residual water content of from about 0.5 to about 3% by weight based on the total weight of the emulsion is formed, mechanically removing the mineral acid salts precipitated thereby and finally removing substantially the balance of the water.

2. The method of claim 1 wherein said initial removal of water is carried out at a temperature of from about 40° C. to about 80° C. under a vacuum of from about 50 to 120 mm. Hg.

3. The method of claim 1 wherein said mineral acid is selected from the group consisting of sulfuric acid and phosphoric acid.

4. The method of claim 1 wherein said final removal of water is carried out at a temperature below about 150° C. under a vacuum of from about 15 to 30 mm. Hg.

5. The method of claim 1 wherein a stabilizer against oxidation is incorporated before the initial removal of water.

6. In the preparation of polyhydric polyoxyalkylene ethers prepared by the reaction of a compound containing active hydrogens selected from the group consisting of polyhydric alcohols, amines, phenols and water, with an alkylene oxide in the presence of an alkalimetal hydroxide, the improvement which comprises reacting said alkali metal hydroxide with an aqueous mineral acid to prepare a mineral salt and removing water from said reaction mixture until a residual water content of from about 0.5 to about 3% by weight based on the total weight of the reaction mixture is formed, mechanically removing the mineral salts precipitated thereby and finally removing the balance of the water under a partial vacuum.

7. The process of claim 6 wherein said alkylene oxide has 3 to 4 carbon atoms.

8. The process of claim 6 wherein said mineral acid is sulphuric acid.

References Cited

UNITED STATES PATENTS

| 2,425,845 | 8/1947 | Toussant et al. |
| 2,510,540 | 5/1950 | Ballard et al. |
| 2,641,614 | 6/1953 | Britton et al. |

FOREIGN PATENTS 657,100  2/1963  Canada.

LEON ZITVER, *Primary Examiner.*

HOWARD T. MARS, *Assistant Examiner.*